United States Patent
Coffey et al.

[15] 3,683,052
[45] Aug. 8, 1972

[54] POLYMERIC COMPOSITIONS

[72] Inventors: Gerald P. Coffey, Cleveland Heights; Lawrence E. Ball, Cuyahoga Falls; June T. Duke, Chagrin Falls, all of Ohio

[73] Assignee: The Standard Oil Company, Cleveland, Ohio

[22] Filed: Aug. 19, 1970

[21] Appl. No.: 65,305

Related U.S. Application Data

[63] Continuation-in-part of Ser. No. 819,125, April 24, 1969, abandoned, which is a continuation-in-part of Ser. No. 764,334, Oct. 1, 1968, abandoned.

[52] U.S. Cl. ..............260/879, 260/880, 260/881, 260/883
[51] Int. Cl. ....................C08f 15/40, C08f 19/08
[58] Field of Search.............260/879, 880, 881, 883

[56] References Cited

UNITED STATES PATENTS

| | | |
|---|---|---|
| 2,857,339 | 10/1958 | Colwell......................260/2.5 |
| 3,451,538 | 6/1969 | Trementozzl................206/46 |
| 3,538,191 | 11/1970 | Meredith et al...........260/878 |
| 3,476,831 | 11/1969 | Daumiller et al..........260/879 |

*Primary Examiner*—Joseph L. Schofer
*Assistant Examiner*—Richard A. Gaither
*Attorney*—John F. Jones and Sherman J. Kemmer

[57] ABSTRACT

Impact-resistant polymers having low permeability to gases and vapors are prepared by polymerizing acrylonitrile with an alpha-olefin such as isobutylene, at least one member selected from the group consisting of an acrylic ester, a methacrylic ester, methacrylonitrile, an acrylamide, and a vinyl ester, and optionally another vinyl monomer component such as a vinyl aromatic monomer in an aqueous medium in the presence of a diene rubber.

10 Claims, No Drawings

POLYMERIC COMPOSITIONS

This application is a continuation-in-part of our co-pending U.S. Pat. application Ser. No. 819,125 filed Apr. 24, 1969, now abandoned, which is a continuation-in-part of our co-pending U.S. Pat. application Ser. No. 764,334 filed Oct. 1, 1968, now abandoned.

The present invention relates to novel polymeric compositions of good impact strength which have excellent thermal stability and low permeability to gases, and more particularly pertains to impact-resistant polymeric compositions which function as gas and vapor barrier materials and are composed of a conjugated diene monomer, acrylonitrile, an alpha-olefin, optionally another monoolefinically unsaturated monomer component such as a vinyl aromatic monomer, and at least one member selected from the group consisting of a vinyl ester, an acrylate ester, an acrylamide, methacrylonitrile, and a methacrylate ester, and to a process for preparing same.

The novel polymeric products of the present invention are prepared by polymerizing a major portion of acrylonitrile, a minor portion of at least one member selected from the group consisting of a vinyl ester, an acrylate ester, an acrylamide, methacrylonitrile, and a methacrylate ester, and optionally a vinyl aromatic monomer such as styrene, in the presence of a preformed rubbery polymer composed of a major proportion of a conjugated diene monomer such as butadiene, and a minor proportion of an olefinically unsaturated nitrile such as acrylonitrile.

The conjugated diene monomers useful in the rubbery copolymer intermediates of the present invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3, and the like, and others. Most preferred for the purpose of this invention are butadiene and isoprene because of their ready availability and their excellent copolymerization properties.

The olefinically unsaturated nitriles useful in the intermediate rubbery copolymers as well as the final polymeric resins of the present invention are the alpha, beta-olefinically unsaturated mononitriles having the structure

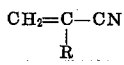

wherein R is hydrogen, a lower alkyl group having from one to four carbon atoms, or a halogen. Such compounds include acrylonitrile, alpha-chloroacrylonitrile, alpha-bromoacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The alpha-olefins useful in the present invention are those having at least four and as many as 10 carbon atoms and having the structure

wherein R' and R" are alkyl groups having from one to seven carbon atoms. More specifically preferred are alpha-olefins such as isobutylene, 2-methyl butene-1, 2-methyl penetene-1, 2-methyl hexene-1, 2-methyl heptene-1, 2-methyl octene-1, 2-ethyl butene-1, 2,4,4-trimethylpentene-1(diisobutylene), 2-propyl pentene-1, and the like. Most preferred are isobutylene and 2-methyl pentene-1.

The vinyl ester monomers useful in the present invention include vinyl acetate, vinyl propionate, the vinyl butyrates, vinyl benzoate, isopropenyl acetate, and generally vinyl esters having the formula

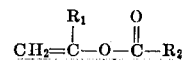

wherein $R_1$ represents hydrogen and a methyl group and $R_2$ represents a hydrocarbon group having from one to eight carbon atoms. Most preferred is vinyl acetate.

The acrylate ester monomers useful in this invention include methyl acrylate, ethyl acrylate, the propyl acrylates, the butyl acrylates, the amyl acrylates, the hexyl acrylates, cyclohexyl acrylate, phenyl acrylate, the octyl acrylates, and the like. Most preferred are methyl acrylate and ethyl acrylate.

The methacrylate ester monomers useful in this invention include methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates, and generally acrylates and methacrylates having the formula

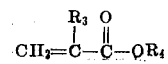

wherein $R_3$ represents hydrogen and methyl and $R_4$ is a hydrocarbon group having from one to 10 carbon atoms. Most preferred is methyl methacrylate.

The acrylamide monomers useful herein include acrylamide, methacrylamide, N-t-butyl acrylamide, N-(1,1,3,3-tetramethyl butyl) acrylamide, N-methyl acrylamide, N-phenyl acrylamide, N-methyl methacrylamide, N-t-butyl methacrylamide, N-vinyl benzamide, N-vinyl pyrrolidone, and diacetone acrylamide. Most preferred are acrylamide, N-t-butyl acrylamide and N-(1,1,3,3-tetramethyl butyl) acrylamide.

The vinyl aromatic monomers useful in this invention include styrene, alpha-methyl styrene, monochlorostyrenes, t-butyl styrenes, vinyl toluene, vinyl xylenes, and vinyl naphthalenes. Preferred are styrene and alpha-methyl styrene and most preferred is styrene.

The polymeric compositions of the present invention can be prepared by any of the known general techniques of polymerization including bulk polymerization, solution polymerization, and emulsion or suspension polymerization techniques by batch, continuous, or intermittent addition of the monomers and other components. The preferred method is polymerization in an aqueous medium such as emulsion or suspension polymerization. The important point in the process of this invention is that the novel polymeric products are prepared by polymerizing in an aqueous medium the acrylonitrile, the alpha-olefin, and other monomers in the presence of a preformed rubbery polymer of the conjugated diene monomer. The polymerization is preferably carried out in an aqueous medium in the presence of an emulsifier and a free-radical generating polymerization initiator at a temperature of from about 0° to 100° C. in the substantial absence of molecular oxygen.

The preferred polymeric compositions embodied herein are those resulting from the polymerization of 100 parts by weight of (A) from 70 to 85 percent by weight of acrylonitrile (B) from 2 to 13 percent by weight of an alpha-olefin having the structure

wherein R' and R'' are alkyl groups having from one to seven carbon atoms, (C) from 2 to 30 percent by weight of at least one monovinyl monomer selected from the group consisting of a vinyl ester, an acrylate ester, an acrylamide, methacrylonitrile, and a methacrylate ester, and (D) from 0 to 17 percent by weight of a vinyl aromatic monomer component in the presence of from 1 to 20 parts by weight of (E) a copolymer of a conjugated diene monomer selected from the group consisting of butadiene and isoprene, and at least one olefinically unsaturated nitrile having the structure

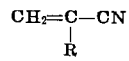

wherein R is hydrogen, a lower alkyl group having from one to four carbon atoms or a halogen containing from 50 to 90 percent by weight of polymerized conjugated diene and from 10 to 50 percent by weight of polymerized olefinically unsaturated nitrile. In the foregoing polymeric compositions it is to be understood that the COMBINED amount of ingredients (A) + (B) + (C) + (D) is always 100 percent. It is also to be understood that in combining the ingredients (A) + (B) + (C) + (D) in no case can the minimum indicated percentages for more than two of these ingredients be employed.

More specifically, the present invention can be illustrated by the polymerization of a mixture of acrylonitrile, isobutylene, methyl acrylate, and styrene in the presence of a preformed copolymer of butadiene-1,3 and acrylonitrile to produce a thermoplastic product having excellent heat distortion properties, impact strength, and exceptionally good impermeability to gases and vapors when exposed to said gases and vapors in the form of a shaped article such as a film or thin sheet.

In the foregoing polymerization it is preferred that from about 1 to 20 parts of the rubbery polymer of butadiene and olefinic nitrile be employed for each 100 parts of a combined acrylonitrile, isobutylene, vinyl or acrylic ester, methacrylic ester, acrylamide monomer, methacrylonitrile, and optionally the other monovinyl monomer component. It has generally been found that as the relative amount of the rubbery polymer of butadiene and olefinic nitrile is increased in the final polymeric product, the impact strength increases and the gas and vapor barrier properties decrease somewhat. It is generally preferred to use just enough of the rubbery copolymer to impart the desired impact strength to the polymeric product and to retain the optimum gas and vapor barrier properties in the polymeric product.

The novel polymeric products of the present invention are thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent heat distortion temperatures and solvent resistance, and their impact strength and low permeability to gases and vapors make them very useful in the packaging industry, and they are particularly useful in the manufacture of bottles, film and other types of containers for liquids and solids.

In the following illustrative examples the amounts of ingredients are expressed in parts by weight unless otherwise indicated.

EXAMPLE 1

A. A butadiene-acrylonitrile elastomer latex was prepared using the following recipe:

| | Parts |
|---|---|
| demineralized water | 200 |
| butadiene | 70 |
| acrylonitrile | 30 |
| t-dodecyl mercaptan | 0.66 |
| fatty acid soap | 1.4 |
| daxad 11 (sodium salt of a condensed alkyl naphthalene sulfonic acid) | 0.1 |
| azobisisobutyronitrile | 0.4 |
| versene Fe-3 specific (41% active aqueous solution) (sodium dihydroxyethyl glycine) | 0.05 |

The polymerization was carried out in the substantial absence of oxygen ($N_2$ atmosphere) at 122° F for about 11 hours. The conversion of monomer to polymer was on the order of 90–93 percent giving a latex having about 31 percent total solids. The latex was stripped at reduced pressure after the addition of a silicone antifoaming agent (0.04 parts of DOW FC–10) for no more than 2 hours and then was filtered through cheese cloth.

B. A tetrapolymer of acrylonitrile, styrene, vinyl acetate and isobutylene was prepared in the presence of some of the rubber latex from A above using the following recipe:

| | Parts |
|---|---|
| demineralized water | 250 |
| acrylonitrile | 79 |
| styrene | 7 |
| vinyl acetate | 7 |
| isobutylene | 7 |
| elastomer from A in form of latex (solids basis) | 15 |
| GAFAC RE–610* (emulsifier) | 3 |
| n-octyl mercaptan (chain transfer agent) | 1.5 |
| potassium persulfate | 0.15 |

*A mixture of $R-O-(CH_2CH_2O-)_nPO_3M_2$ and $[R-O-(CH_2CH_2O-)_n]_2PO_2M$ wherein n is a number of from 1 to 40, R is an alkyl or alkanyl group and preferably a nonyl phenyl group, and M is hydrogen, ammonia or an alkali group, which composition is sold by General Aniline and Film Corporation.

The polymerization was carried out in the substantial absence of oxygen (N₂ sweeping) and initially at 55° C., and at about 30 percent conversion the temperature was increased to 60° C. and maintained. The total reaction time wa12 hours and 82 percent conversion was achieved. The resulting latex was coagulated using alum solution for coagulant and the crumbs were washed and dried. The thermoplasticity of this resin was established by mixing 50 grams of resin in the Brabender Plasticorder at 235° C. and 35 rpm with the following results:

| Time | Torque (meter grams) |
| --- | --- |
| 5 minutes | 1960 |
| 10 minutes | 1900 |
| 15 minutes | 1860 |

The resin crumb was extruded and the extrudate was pelletized. The pellets were used in an extrusion blow-molding apparatus to blow mold 6-ounce bottles. The bottles were transparent. Some of the bottles were filled with water, capped and dropped at a 45° angle. The average drop height without breaking was 7 feet for a series of 25 bottles.

Some of the resin crumb was injection molded into test bars. The injection-molded test bars had a notched Izod impact strength of 1.2 foot pounds per inch of notch and an ASTM heat distortion temperature (HDT) of 79.5° C (264 psi). Tensile strength was 9,010 psi, flexural strength was 11,500 psi, tensile modulus was 485,000 psi, and flexural modular was 394,000 psi.

Films were pressed from bottle walls and tested for gas barrier properties. The oxygen transmission rate was 0.37–0.70 cc mil/atmosphere/100 inches²/24 hours and the water vapor transmission rate was 2.9–3.7 grams mil/100 inches²/24 hours.

EXAMPLE 2

A tetrapolymer of acrylonitrile, styrene, methyl acrylate and isobutylene was prepared in the presence of a butadiene-acrylonitrile rubber latex by the procedure described in Example 1 using a monomer charge in step B of Example 1 of 70:10:10:10 parts by weight of acrylonitrile:styrene:methyl acrylate:isobutylene, respectively. The resulting resin was compression molded into test bars which were found to have an ASTM heat distortion temperature of 69° C. and a notched Izod impact strength of 7.0 foot pounds per inch of notch.

EXAMPLE 3

A tetrapolymer of acrylonitrile, styrene, methyl acrylate and isobutylene was prepared in the presence of a butadiene-acrylonitrile rubber latex following the procedure of example 1 using a monomer charge of 70:12:9:9 parts by weight of acrylontrile:styrene:methyl acrylate:isobutylene, respectively. The resulting resin was found to have an ASTM heat distortion temperature of 72° C. and a notched Izod impact strength of 4.8 foot pounds per inch of notch.

EXAMPLE 4

A tetrapolymer of acrylonitrile, styrene, methyl acrylate and isobutylene was prepared in the presence of a butadiene-acrylonitrile rubber latex following the procedure of Example 1 using a monomer charge of 70:14:8:8 parts of acrylonitrile:styrene:methyl acrylate:isobutylene, respectively. The resulting resin was found to have an ASTM heat distortion temperature of 75° C. and a notched Izod impact strength of 7.7 foot pounds per inch of notch.

EXAMPLE 5

A tetrapolymer of acrylonitrile, styrene, methyl acrylate and isobutylene was prepared in the presence of a butadiene-acrylonitrile rubber latex following the procedure of Example 1 using a monomer charge of 70:16:7:7 parts of acrylonitrile:styrene:methyl acrylate:isobutylene, respectively. The resulting resin was found to have an ASTM heat distortion temperature of 77° C. and a notched Izod impact strength of 8.3 foot pounds per inch of notch.

EXAMPLE 6

A tetrapolymer of acrylonitrile, styrene, methyl acrylate and isobutylene was prepared in the presence of a butadiene-acrylonitrile rubber latex following the procedure of Example 1 using a monomer charge of 75:11:7:7 parts of acrylonitrile:styrene:methyl acrylate:isobutylene, respectively. The resulting resin was found to have an ASTM heat distortion temperature of 74° C. and a notched Izod impact strength of 11.8 foot pounds per inch of notch.

In a similar manner, a series of polymers of the above composition was prepared wherein the amount of elastomer (on a solids basis) was varied between 9 and 14 parts. The effect on the notched Izod impact of the resulting polymers was as follows:

| Parts of Rubber in Polymer | Notched Izod Impact (foot pounds per inch of notch) |
| --- | --- |
| 9 | 1.4 |
| 10 | 1.4 |
| 11 | 2.6 |
| 12 | 2.1 |
| 13 | 3.7 |
| 14 | 6.8 |

EXAMPLE 7

A tetrapolymer of acrylonitrile, alpha-methyl styrene, methyl acrylate and isobutylene was prepared in the presence of a butadiene-acrylonitrile rubber latex according to the procedure of Example 1 using a monomer charge in step B of Example 1 of 75:5:10:10 parts of acrylonitrile:alpha-methyl styrene:methyl acrylate:isobutylene, respectively. The resulting resin was found to have an ASTM heat distortion temperature of 69° C. and a notched Izod impact strength of 13.4 foot pounds per inch of notch.

EXAMPLE 8

A tetrapolymer of acrylonitrile, alpha-methyl styrene, methyl acrylate and isobutylene was prepared in the presence of a butadiene-acrylonitrile rubber latex according to the procedure of Example 1 using a monomer charge in step B of Example 1 of 75:7:9:9 parts of acrylonitrile:alpha-methyl styrene:methyl acrylate:isobutylene, respectively. The resulting resin was found to have an ASTM heat distortion temperature of 72° C. and a notched Izod impact strength of 12.7 foot pounds per inch of notch.

EXAMPLE 9

A tetrapolymer of acrylonitrile, alpha-methyl styrene, methyl acrylate and isobutylene was prepared in the presence of a butadiene-acrylonitrile rubber latex according to the procedure of Example 1 using a monomer charge of 75:9:8:8 parts of acrylonitrile:alpha-methyl styrene:methyl acrylate:isobutylene, respectively. The resulting resin was found to have an ASTM heat distortion temperature of 72° C. and a notched Izod impact strength of 10.6 foot pounds per inch of notch.

EXAMPLE 10

A tetrapolymer of acrylonitrile, alpha-methyl sytrene, methyl acrylate and isobutylene was prepared in the presence of a butadiene-acrylonitrile rubber latex following the procedure of Example 1 using a monomer charge in step B of Example 1 of 75:11:7:7 parts by weight of acrylonitrile:alpha-methyl styrene:methyl acrylate:isobutylene, respectively. The resulting resin was found to have an ASTM heat distortion temperature of 73° C. and a notched Izod impact strength of 8.0 foot pounds per inch of notch.

EXAMPLE 11

A tetrapolymer of acrylonitrile, methyl acrylate and isobutylene was prepared in the presence of a butadiene-acrylonitrile rubber latex following the procedure of Example 1 using a monomer charge in step B of 80:10:10 parts by weight of acrylonitrile:methyl acrylate:isobutylene, respectively. The resulting resin was found to have an ASTM heat distortion temperature of 70° C. and a notched Izod impact strength of 14.7 foot pounds per inch of notch.

EXAMPLE 12

A tetrapolymer of acrylonitrile, methyl methacrylate, methyl acrylate and isobutylene was prepared in the presence of a butadiene-acrylonitrile rubber latex following the procedure of Example 1 using a monomer charge of 70:24:3:3 parts of acrylonitrile:methyl methacrylate:methyl acrylate:isobutylene, respectively. The resulting resin was found to have an ASTM heat distortion temperature of 70° C. and a notched Izod impact strength of 2.7 foot pounds per inch of notch.

EXAMPLE 13

A tetrapolymer of acrylonitrile, styrene, methyl methacrylate and isobutylene was prepared in the presence of a butadiene-acrylonitrile rubber latex by the procedure described in Example 1 using a monomer charge in step B of 75:5:10:10 parts of acrylonitrile:styrene:methyl methacrylate:isobutylene, respectively. The resulting resin was compression molded into test bars which were found to have an ASTM heat distortion temperature of 81° C. and a notched Izod impact strength of 3.4 foot pounds per inch of notch.

EXAMPLE 14

A tetrapolymer of acrylonitrile, methacrylonitrile, methyl methacrylate and isobutylene was prepared in the presence of a butadiene-acrylonitrile rubber latex by the procedure of Example 1 using a monomer charge in step B of 70:10:10:10 parts of acrylonitrile:methacrylonitrile:methyl methacrylate:isobutylene, respectively. The resulting resin was compression molded into test bars which were found to have an ASTM heat distortion temperature of 79° C. and a notched Izod impact strength of 11.4 foot pounds per inch of notch.

EXAMPLE 15

A tetrapolymer of acrylonitrile, methacrylonitrile, methyl acrylate and isobutylene was prepared in the presence of a butadiene-acrylonitrile rubber latex by the procedure of Example 1 using a monomer charge in step B 70:10:10:10 parts of acrylonitrile:methacrylonitrile:methyl acrylate:isobutylene, respectively. The resulting resin was compression molded into test bars which were found to have an ASTM heat distortion temperature of 70° C. and a notched Izod impact strength of 16.9 foot pounds per inch of notch.

EXAMPLE 16

A tetrapolymer of acrylonitrile, styrene, vinyl acetate and isobutylene was prepared in the presence of a butadiene-acrylonitrile rubber latex by the procedure of Example 1 using a monomer charge in step B of 75:5:10:10 parts of acrylonitrile:styrene:vinyl acetate:isobutylene, respectively. The resulting resin was compression molded into test bars which were found to have an ASTM heat distortion temperature of 77° C. and a notched Izod impact strength of 13.6 foot pounds per inch of notch.

EXAMPLE 17

A tetrapolymer of acrylonitrile, styrene, vinyl acetate and isobutylene was prepared in the presence of a butadiene-acrylonitrile rubber latex by the procedure of Example 1 using in step B the monomer charge of 75:11:7:7 parts of acrylonitrile:styrene:vinyl acetate:isobutylene, respectively. The resulting resin was compression molded into test bars which had an ASTM heat distortion temperature of 79° C. and a notched Izod impact strength of 7.7 foot pounds per inch of notch.

EXAMPLE 18

A tetrapolymer of acrylonitrile, styrene, vinyl acetate and isobutylene was prepared in the presence of a butadiene-acrylonitrile rubber latex by the procedure of Example 1 using a monomer charge in step B of 80:8:6:6 parts of acrylonitrile:styrene:vinyl acetate:isobutylene, respectively. The resulting resin was found to have an ASTM heat distortion temperature of 80° C. and a notched Izod impact strength of 1.2 foot pounds per inch of notch.

EXAMPLE 19

A tetrapolymer of acrylonitrile, styrene, vinyl acetate and isobutylene was prepared in the presence of a butadiene-acrylonitrile rubber latex by the procedure of Example 1 using a monomer charge in step B of 83:3:7:7 parts of acrylonitrile:styrene:vinyl acetate:isobutylene, respectively. The resulting resin was found to have an ASTM heat distortion temperature of 77° C. and a notched Izod impact strength of 2.8 foot pounds per inch of notch.

EXAMPLE 20

A tetrapolymer of acrylonitrile, styrene, methacrylonitrile and isobutylene was prepared in the presence of a butadiene-acrylonitrile rubber latex in accordance with Example 1 using in step B a monomer charge of 75:5:10:10 parts of acrylonitrile:styrene:methacrylonitrile:isobutylene, respectively. The resulting resin was compression molded into test bars which were found to have an ASTM heat distortion temperature of 82° C. and a notched Izod impact strength of 9.7 foot pounds per inch of notch.

EXAMPLE 21

A tetrapolymer was prepared from acrylonitrile, styrene, N-t-octyl acrylamide [N-(1,1,3,3-tetramethylbutyl) acrylamide] and isobutylene in the presence of a butadiene-acrylonitrile rubber latex by the procedure of Example 1 using in step B a monomer charge of 75:5:10:10 parts of acrylonitrile:styrene:N-t-octyl acrylamide:isobutylene, respectively. The resulting resin was found to have an ASTM heat distortion temperature of 75° C. and a notched Izod impact strength of 22.7 foot pounds per inch of notch.

EXAMPLE 22

A tetrapolymer of acrylonitrile, styrene, N-t-butyl acrylamide and isobutylene was prepared in the presence of a butadiene-acrylonitrile rubber latex by the procedure of Example 1 using in step B a monomer charge of 75:5:10:10 parts of acrylonitrile:styrene:N-t-butyl acrylamide:isobutylene, respectively. The resulting resin was found to have an ASTM heat distortion temperature of 79° C. and a notched Izod impact strength of 19.1 foot pounds per inch of notch.

EXAMPLE 23

A tetrapolymer of acrylonitrile, alpha-methyl styrene, methyl acrylate and 2-methyl pentene-1 was prepared in the presence of a butadiene-acrylonitrile rubber latex following the procedure of Example 1 using in step B a monomer charge of 70:10:10:10 parts of acrylonitrile:alpha-methyl styrene: methyl acrylate:2-methyl pentene-1, respectively. The resulting resin was found to have an ASTM heat distortion temperature of 76° C. and a notched Izod impact strength of 2.3 foot pounds per inch of notch.

EXAMPLE 24

A tetrapolymer of acrylonitrile, styrene, methyl acrylate and 2-methyl pentene-1 was prepared in the presence of a butadiene-acrylonitrile rubber latex by the procedure more fully described in Example 1 using as monomer charge in step B 70:10:10:10 parts of acrylonitrile:styrene:methyl acrylate:2-methyl pentene-1, respectively. The resulting resin was found to have an ASTM heat distortion temperature of 72° C. and a notched Izod impact strength of 16.3 foot pounds per inch of notch.

EXAMPLE 25

A tetrapolymer of acrylonitrile, styrene, vinyl acetate and 2-methyl pentene-1 was prepared in the presence of a butadiene-acrylonitrile rubber latex by the procedure of Example 1 using a monomer charge of 75:11:7:7 parts of acrylonitrile:styrene:vinyl acetate:2-methyl pentene-1, respectively. The resulting resin was found to have an ASTM heat distortion temperature of 85° C. and a notched Izod impact strength of 1.5 foot pounds per inch of notch.

EXAMPLE 26

A pentapolymer of acrylonitrile, styrene, methyl methacrylate, methyl acrylate and isobutylene was prepared in the presence of a butadiene-acrylonitrile rubber latex by the procedure of Example 1 using a monomer charge of 75:9:4:4:8 parts of acrylonitrile:styrene:methyl methacrylate:methyl acrylate:isobutylene, respectively. The resulting resin was found to have an ASTM heat distortion temperature of 81° C. and a notched Izod impact strength of 7.4 foot pounds per inch of notch.

EXAMPLE 27

A pentapolymer of acrylonitrile, styrene, methyl methacrylate, vinyl acetate and isobutylene was prepared in the presence of a butadiene-acrylonitrile rubber latex by the procedure of Example 1 using a monomer charge in step B of 75:9:4:4:8 parts of acrylonitrile:styrene:methyl methacrylate:vinyl acetate:isobutylene, respectively. The resulting resin was found to have an ASTM heat distortion temperature of 82° C. and a notched Izod impact strength of 7.3 foot pounds per inch of notch.

EXAMPLE 28

A tetrapolymer of acrylonitrile, methacrylonitrile, vinyl acetate and isobutylene was prepared in the presence of a butadiene-acrylonitrile rubber latex having a ratio of butadiene:acrylonitrile of 65:35 on a weight basis by the procedure of Example 1 using a monomer charge of 70:10:10:10 parts of acrylonitrile:methacrylonitrile:vinyl acetate:isobutylene, respectively. The resulting resin was found to have an ASTM heat distortion temperature of 79° C. and a notched Izod impact strength of 10.1 foot pounds per inch of notch.

EXAMPLE 29

A tetrapolymer of acrylonitrile, acrylamide, vinyl acetate and isobutylene was prepared in the presence of a butadiene-acrylonitrile rubber latex by the procedure of Example 1 using a monomer charge in step B of 75:5:10:10 parts of acrylonitrile: acrylamide:vinyl acetate:isobutylene, respectively. The resulting resin was found to have an ASTM heat distortion temperature of 70° C. and a notched Izod impact strength of 12.1 foot pounds per inch of notch.

EXAMPLE 30

A tetrapolymer of acrylonitrile, styrene, acrylamide and isobutylene was prepared in the presence of a butadiene-acrylonitrile rubber latex by the procedure of Example 1 using a monomer ratio in step B of 75:5:10:10 parts of acrylonitrile:styrene:acrylamide:isobutylene, respectively. The resulting resin was found to have an ASTM heat distortion temperature of 77° C. and a notched Izod impact strength for 4.7 foot pounds per inch of notch.

EXAMPLE 31

A tetrapolymer of acrylonitrile, styrene, vinyl acetate and isobutylene was prepared in the presence of a butadiene-acrylonitrile rubber latex by the procedure of Example 1 using a monomer charge in step B of 84:2:7:7 parts of acrylonitrile:styrene:vinyl acetate:isobutylene, respectively. The resulting resin was found to have an ASTM heat distortion temperature of 77° C. and a notched Izod impact strength of 2.6 foot pounds per inch of notch.

EXAMPLE 32

A tetrapolymer of acrylonitrile, styrene, vinyl acetate and isobutylene was prepared in the presence of a butadiene-acrylonitrile rubber latex by the procedure of Example 1 using a monomer ratio of 85:1:7:7 parts of acrylonitrile:styrene:vinyl acetate:isobutylene, respectively. The resulting resin was found to have an ASTM heat distortion temperature of 75° C. and a notched Izod impact strength of 1.1 foot pounds per inch of notch.

We claim:

1. The polymeric composition resulting from the polymerization in an aqueous medium of
   A. from 70 to 85 percent by weight of acrylonitrile, and
   B. from 2 to 13 percent by weight of an alpha-olefin having the structure

wherein R' and R'' are alkyl groups having from one to seven carbon atoms, and
   C. from 2 to 30 percent by weight of at least one monovinyl monomer selected from the group consisting of a vinyl ester, an acrylate ester, an acrylamide, methacrylonitrile, and a methacrylate ester, and
   D. from 0 to 17 percent by weight of a vinyl aromatic monomer component
   wherein the combined amount of (A) + (B) + (C) + (D) is always 100 percent in the presence of from 1 to 20 parts by weight per 100 parts by weigh of (A) + (B) + (C) + (D) of
   E. a copolymer of a conjugated diene monomer selected from the group consisting of butadiene and isoprene, and at least one olefinically unsaturated nitrile having the structure

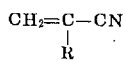

wherein R is hydrogen, a lower alkyl group having from one to four carbon atoms, or a halogen, said copolymer containing from 50 to 90 percent by weight of polymerized conjugated diene and from 10 to 50 percent by weight of polymerized olefinically unsaturated nitrile.

2. The composition of claim 1 wherein the olefinically unsaturated nitrile is selected from the group consisting of acrylonitrile and methacrylonitrile.

3. The composition of claim 2 wherein the alpha-olefin is isobutylene.

4. The composition of claim 2 wherein the alpha-olefin is 2-methyl pentene-1.

5. The composition of claim 2 wherein the alpha-olefin is 2-methyl butene-1.

6. The process comprising polymerizing in an aqueous medium in the presence of an emulsifier and a free radical generating polymerization initiator at a temperature of from about 0° to 100° C in the substantial absence of molecular oxygen a mixture of
   A. from 70 to 85 percent by weight of acrylonitrile, and
   B. from 2 to 13 percent by weight of an alpha-olefin having the structure

wherein R' and R'' are alkyl groups having from one to seven carbon atoms, and
   C. from 2 to 30 percent by weight of at least one monovinyl monomer selected from the group consisting of a vinyl ester, an acrylate ester, an acrylamide, methacrylonitrile, and a methacrylate ester, and
   D. from 0 to 17 percent by weight of a vinyl aromatic monomer component
   wherein the combined amount of (A) + (B) + (C) + (D) is always 100 percent in the presence of from 1 to 20 parts by weight per 100 parts by weight of combined (A) + (B) + (C) + (D) of
   E. a copolymer of a conjugated diene monomer selected from the group consisting of butadiene and isoprene, and at least one olefinically unsaturated nitrile having the structure

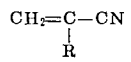

wherein R is hydrogen, a lower alkyl group having from one to four carbon atoms, or a halogen, said copolymer containing from 50 to 90 percent by weight of polymerized conjugated diene and from 10 to 50 percent by weight of polymerized olefinically unsaturated nitrile.

7. The process of claim 6 wherein the olefinically unsaturated nitrile is a member selected from the group consisting of acrylonitrile and methacrylonitrile.

8. The process of claim 7 wherein the alpha-olefin is isobutylene.

9. The process of claim 7 wherein the alpha-olefin is 2-methyl pentene-1.

10. The process of claim 7 wherein the alpha-olefin is 2-methyl butene-1.

* * * * *

PO-1050
(5/69)

UNITED STATES PATENT OFFICE
CERTIFICATE OF CORRECTION

Patent No. 3,683,052　　　　　　　　Dated August 8, 1972

Inventor(s) G. P. Coffey, et al

It is certified that error appears in the above-identified patent and that said Letters Patent are hereby corrected as shown below:

Column 1: Line 24, after "a minor portion of" insert --an alpha-olefin such as isobutylene, and a minor portion of--

Column 2: Line 4, "penetene" should be --pentene--

Column 3: Line 44, "COMBINED" should be --combined--

Column 5: Line 9, "wal2" should be --was 12--

Column 5: Line 63, "example 1" should be --Example 1--

Column 7: Line 34, "tetrapolymer" should be --terpolymer--

Column 8: Line 20, after "B" insert --of--

Column 11: Line 10, "for" should be --of--

Column 11: Line 59, "weigh" should be --weight--

Signed and sealed this 29th day of May 1973.

(SEAL)
Attest:

EDWARD M. FLETCHER, JR.
Attesting Officer

ROBERT GOTTSCHALK
Commissioner of Patents